United States Patent [19]

Efflandt

[11] 4,322,938
[45] Apr. 6, 1982

[54] DEFLECTOR MEMBER FOR A ROTARY LAWN MOWER

[75] Inventor: James F. Efflandt, Galesburg, Ill.

[73] Assignee: Outboard Marine Corporation, Waukegan, Ill.

[21] Appl. No.: 192,864

[22] Filed: Oct. 1, 1980

[51] Int. Cl.³ ............................................. A01D 35/26
[52] U.S. Cl. ...................................... 56/320.2; 56/17.4
[58] Field of Search ................... 56/320.1, 320.2, 17.4, 56/255

[56] References Cited

U.S. PATENT DOCUMENTS

| | | | |
|---|---|---|---|
| 3,391,524 | 7/1968 | Nickoloff et al. | 56/320.2 |
| 3,673,778 | 7/1972 | Ramey | 56/320.2 |
| 3,680,294 | 8/1972 | Dacus et al. | 56/320.1 |
| 3,729,911 | 5/1973 | Dahl et al. | 56/320.2 |
| 3,760,572 | 9/1973 | Marion et al. | 56/320.2 |
| 4,258,539 | 3/1981 | Pearce et al. | 56/320.2 |

Primary Examiner—Robert A. Hafer
Attorney, Agent, or Firm—Michael, Best & Friedrich

[57] ABSTRACT

A lawn mower comprises a housing which encloses a rotary cutting blade and which includes a sidewall having therein a generally horizontal grass discharge passage. A member is carried by the housing and extends in the grass discharge passage below the plane of cutting blade rotation. The member includes an inner edge portion which is located adjacently outside the periphery of the path of cutting blade rotation and an oppositely spaced outer edge portion. A lip extends generally vertically downwardly from the outer edge portion. The member deflects objects struck by the cutting blade and thereby obstructs the discharge of these objects outwardly from the housing through the grass discharge passage.

13 Claims, 6 Drawing Figures

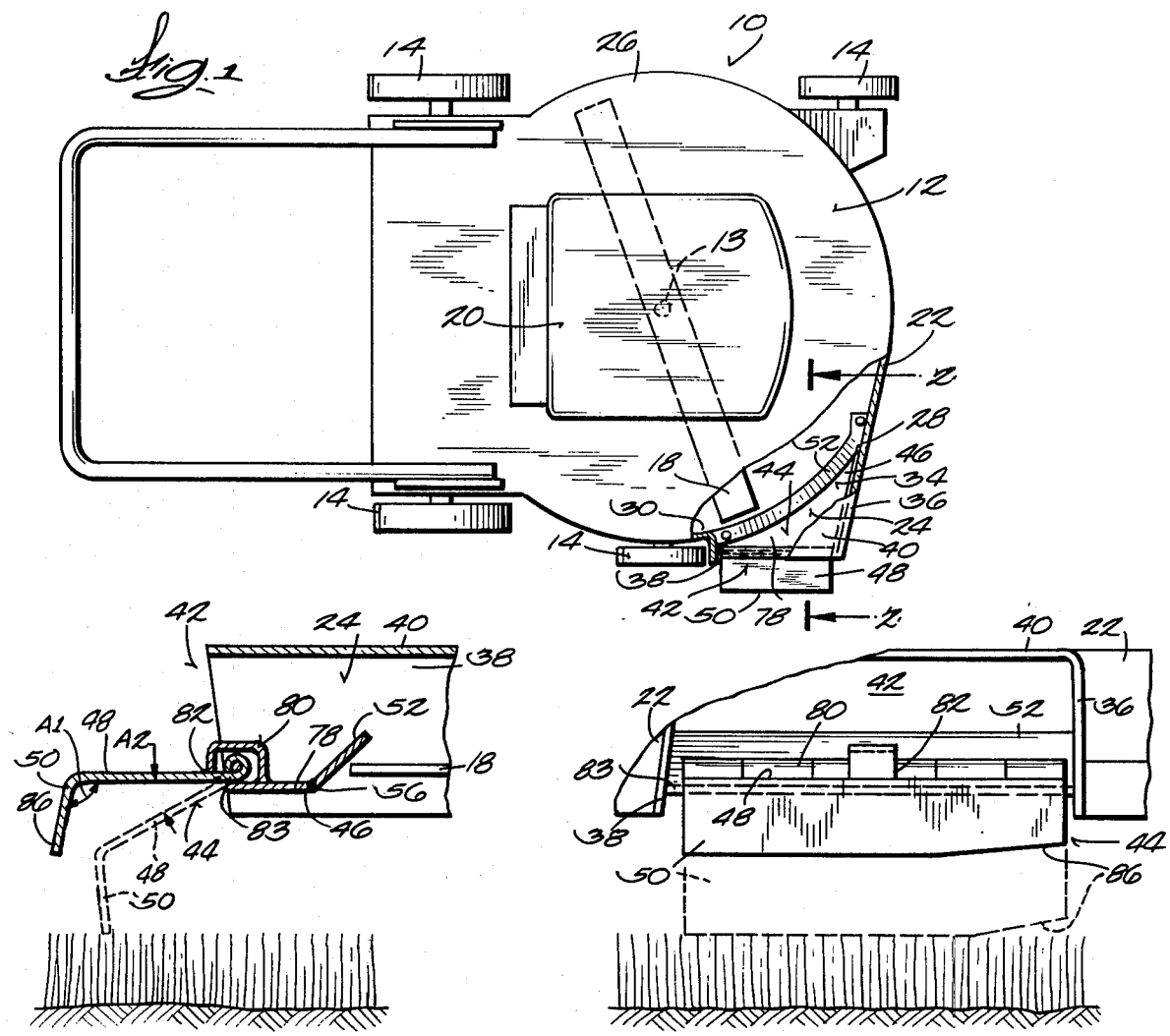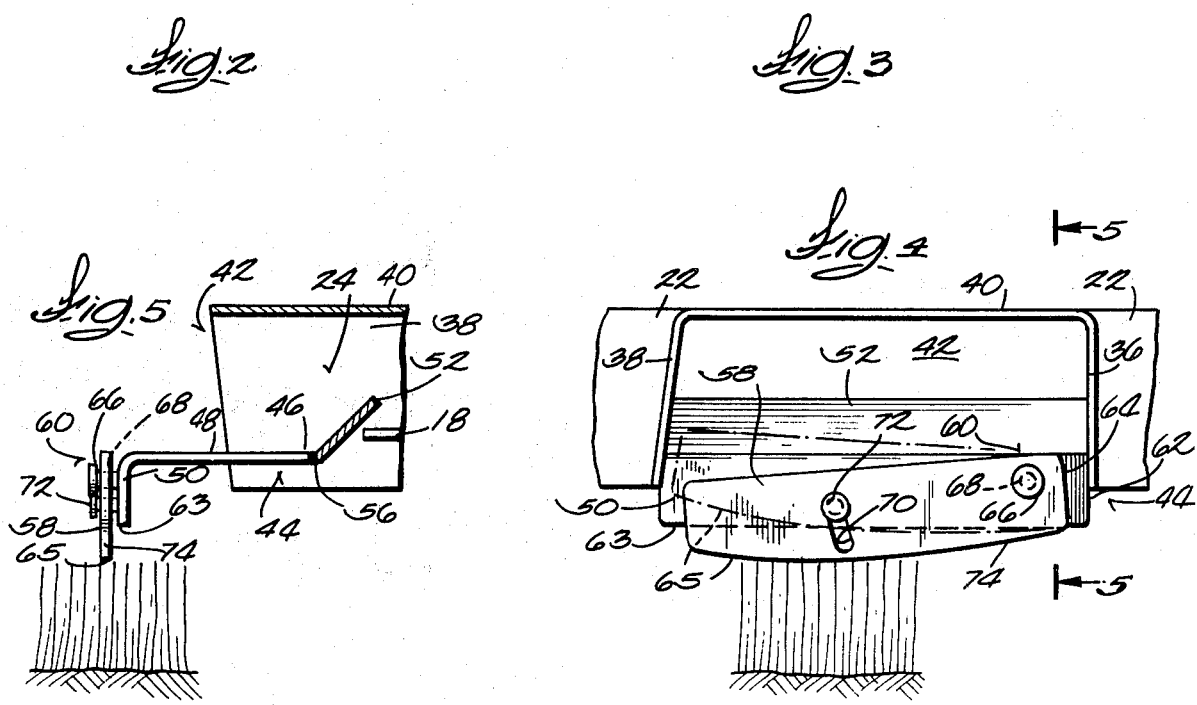

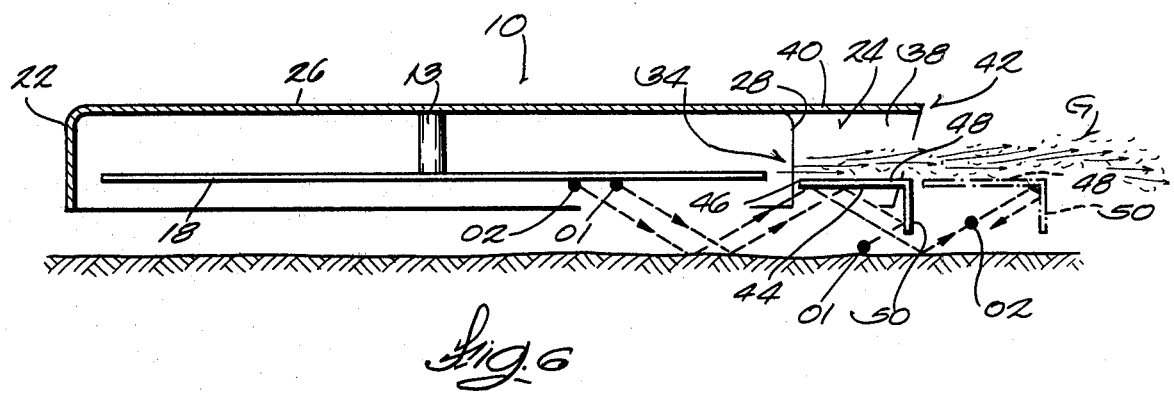

DEFLECTOR MEMBER FOR A ROTARY LAWN MOWER

FIELD OF THE INVENTION

The invention relates generally to rotary type lawn mowers. More particularly, the invention relates to deflectors associated with grass discharge passages of rotary type lawn mowers.

DESCRIPTION OF THE PRIOR ART

Attention is directed to the following United States Patents which disclose various rotary lawn mower constructions:

| | | |
|---|---|---|
| Coners | 2,708,334 | March 17, 1955 |
| Phelps | 2,726,503 | December 13, 1955 |
| Pearson | 3,145,519 | August 25, 1964 |
| Furtaw | 3,613,338 | October 19, 1971 |
| Grimes | 3,646,740 | March 7, 1972 |
| Bright | 2,864,226 | December 16, 1958 |
| Efflandt | 3,648,445 | March 14, 1972 |
| Rutherford | 3,680,295 | August 1, 1972 |
| Dahl | 3,696,595 | October 10, 1972 |
| Dahl et al | 3,729,911 | May 1, 1973 |
| Marion et al | 3,760,572 | September 25, 1973 |
| Christopherson | 3,919,832 | November 18, 1975 |
| Messner | Re 29,139 | February 22, 1977 |
| Rutherford | 4,107,907 | August 22, 1978 |

SUMMARY OF THE INVENTION

The invention provides a lawn mower comprising a housing enclosing a rotary cutting blade and including a sidewall having therein a generally horizontal grass discharge passage. A member is carried by the housing and extends in the grass discharge passage below the plane of cutting blade rotation. The member includes an inner edge portion located adjacently outside the periphery of the path of cutting blade rotation and an oppositely spaced outer edge portion. A lip extends generally downwardly from the outer edge portion of the member. Objects struck by the rotary cutting blade are deflected by the member and the downwardly depending lip away from the grass discharge passage.

In one embodiment, the lawn mower includes a flange member. Means is provided for operatively connecting the flange member on the lip for vertical movement relative to the lip. The vertically movable flange member further extends the vertical extension of the lip below the plane of cutting blade rotation.

In one embodiment, the member includes a mid-body portion which extends from the inner edge portion and which is fixed relative to the housing. In this embodiment, means is provided for hingedly attaching the outer edge portion of the member to its mid-body portion for vertical movement relative thereto between a position generally coplanar with the mid-body portion and a position extending vertically downwardly from the mid-body portion. As in the embodiment just described, the vertical extension of the lip below the plane of cutting blade rotation is thus increased.

In one embodiment, the outer edge portion of the member terminates generally adjacent to the outlet of the grass discharge passage.

In one embodiment, the outer edge portion of the member extends outwardly beyond the outlet of the grass discharge passage.

One of the principal features of the invention is the provision of a rotary lawn mower having a grass discharge passage, in which passage a member is located below the plane of cutting blade rotation to deflect away from the grass discharge passage objects struck by the cutting blade, thereby reducing the number of such objects which are thrown outwardly of the lawn mower housing.

Other features and advantages of the embodiments of the invention will become known by reference to the following general description, claims, and drawings.

DESCRIPTION OF THE DRAWINGS

FIG. 1 is a top view, with parts broken away, of a lawn mower having a deflector member embodying various of the features of the invention;

FIG. 2 is an enlarged side view of the deflector member taken generally along line 2—2 in FIG. 1;

FIG. 3 is an enlarged front view of the deflector member shown in FIG. 1;

FIG. 4 is an enlarged front view of an alternate deflector member suited for use with the lawn mower shown in FIG. 1;

FIG. 5 is a side view of the alternate deflector member taken generally along line 5—5 in FIG. 4; and FIG. 6 is an enlarged diagrammatic side view of the interior of a lawn mower housing in which a rotary cutting blade is carried and which includes a deflector member which embodies various of the features of the invention.

Before explaining the embodiments of the invention in detail, it is to be understood that the invention is not limited in its application to the detailed construction and the arrangement of components set forth in the following description and as illustrated in the drawings. The invention is capable of other embodiments and of being practiced and carried out in various ways.

GENERAL DESCRIPTION

Shown in FIG. 1 is a lawn mower 10 which includes a housing 12 supported by wheels 14 for movement over the ground. The housing 12 includes a vertical sidewall 22 and a horizontal top wall 26 or deck extending from the sidewall 22. Grass is cut by a rotary cutting blade 18 supported within the housing 12 on the drive shaft 13 (see also FIG. 6) of an engine 20 carried on the top wall 26 of the housing 12.

While various constructions are possible, in the illustrated embodiment (and still referring principally to FIG. 1), the sidewall 22 has an arcutate extent of less than 360° and terminates with arcuately spaced edges 28 and 30. Together with the overhanging top wall 26, the edges 28 and 30 define an opening 34 in the sidewall 22.

A grass discharge passage 24 extends from the opening 34 and includes forwardly and rearwardly located sidewalls 36 and 38 as well as an upper wall 40 which connects the sidewalls 36 and 38 and which extends from the top wall 26 of the housing 12. The grass discharge passage 24 terminates at an outlet 42 which is spaced radially outwardly from the path of cutting blade rotation and through which airborne grass clippings are discharged from the housing 12 in response to cutting blade rotation.

Objects, such as sticks or stones, which enter the path of cutting blade rotation can also be thrown by the cutting blade 18 through the outlet 42 of the discharge passage 24. In order to reduce the number and height of travel of these objects being thrown outwardly from the housing, a member 44 extends in the grass discharge passage 24 below the plane of cutting blade rotation. Generally, and as is shown in all of the three specific embodiments shown, respectively, in FIGS. 1 through 3, FIGS. 4 and 5, and FIG. 6, the member 44 includes an inner edge portion 46 which is located adjacently outside the periphery of the path of cutting blade rotation and an oppositely spaced outer end portion 48. A lip 50 extends generally vertically downwardly from the outer edge portion 48 of the member 44.

As is shown diagrammatically in FIG. 6, airborne grass clippings (generally identified by the letter "G" in FIG. 6) are carried by the air flow occassioned by cutting blade rotation and discharged through the grass discharge outlet 42 at and above the plane of cutting blade rotation. The member 44 does not obstruct this discharge. However, other objects, such as sticks or stones (generally identified as 0-1 and 0-2 in FIG. 6), which come into contact with the cutting blade 18 are typically hit with a glancing blow and ricochet off the ground below the path of cutting blade rotation. The path of such movement of objects 0-1 and 0-2 is shown in dotted lines in FIG. 6. As can be seen in FIG. 6, these objects are deflected by the member 44 and its downwardly depending lip 50 away from the grass discharge passage 24. As a consequence, the objects are either completely blocked by the member 44 and its downwardly depending lip 50 from discharge outwardly from the housing 12 (as is object 0-1), or are deflected by the member 44 to the extent that their height of travel beyond the housing 12 is reduced (as is object 0-2).

While the lip 50 may be positioned in general alignment with the grass discharge outlet 42 (as shown in solid lines in FIG. 6), by extending the outer edge portion 48 of member 44 outwardly beyond the grass discharge outlet 42 (as is shown in phantom lines in FIG. 6), the ability of the member 44 to completely block the discharge of all objects struck by the blade 18 is enhanced. It will be noted that both objects 0-1 and 0-2 will be blocked from discharge by the outwardly extending member 44 shown in phantom lines in FIG. 6. Because of this advantage, in the other two embodiments shown in FIGS. 1 through 5, the outer edge portion 48 extends outwardly beyond the grass discharge outlet 42.

In the other two embodiments shown in FIGS. 1 through 5, a member 52 extends between the edges 28 and 30 of the sidewall 22 adjacently outside the periphery of the path of the cutting blade 18. Use of this member is generally disclosed in U.S. Pat. No. 3,729,911, issued May 1, 1973. The member 52 includes a lower edge 56 (see FIGS. 2 and 5) which extends below the plane of cutting blade rotation. The purpose of this member 52, which is also generally referred to as a "toe bar", is to prevent operator contact with the cutting blade 18 through the discharge passage 24.

In this construction (and as is best seen in FIGS. 1, 2 and 5) the inner edge portion 46 of the member 44 is connected, such as by welding, to the lower edge 56 of the toe bar member 52, so that the member 44 extends in the grass discharge passage 24 generally horizontally outwardly from the lower edge 56 of the toe bar member 52. It should be appreciated, however, that the member 44 may be connected to the housing 12 by various means and without the associated use of the toe bar member 52.

Referring first to the embodiment shown in FIGS. 4 and 5, in order to further enhance the ability of the lip 50 to completely block the discharge of objects struck by the cutting blade 18, a flange member 58 is provided, along with means 60 which operatively connects the flange member 58 on the lip 50 so that the flange member 58 is vertically movable relative to the lip 50. The vertically movable flange member 58 increases the downward vertical extension of the lip 50 below the plane of cutting blade rotation at high cutting heights.

While various constructions are possible, in the embodiment illustrated in FIGS. 4 and 5, the lip 50 and flange member 58 both include a forward edge, respectively, 62 and 64. The means 60 includes a pin 66 attached, such as by welding, adjacent to the forward edge 62 of the lip 50 and a hole 68 drilled adjacent to the forward edge 64 of the flange member 58. The pin 62 is engaged in the hole 68, and the end of the pin 62 is capped to secure the flange member 58 on the lip 50 for pivotal movement.

The extent of vertical pivotal movement of the flange member 58 relative to the lip 50 is limited by means of an arcuate slot 70 in the flange member 58 (see FIG. 4) and a pin 72 on the lip 50 projecting through the slot 70. Movement of the flange member 58 is thus permitted only between an upward position (as shown in phantom lines in FIG. 4) in which the lower edge 65 of the flange member 58 is generally aligned with the lower edge 63 of the lip 50 and a downward position (shown in solid lines in FIG. 4) in which the lower edge 65 of the flange member 58 extends at an angle downwardly from the fixed lower edge 63 of the lip 50. At high cutting heights, the flange member 58 is disposed in its downward position to maximize the vertical extension of the lip 50 below the plane of cutting blade rotation. At progressively lower cutting heights, the lower edge 65 of the flange member 58 contacts the turf, and the flange member 58 moves, according to the turf height, progressively upward until its upward position is reached.

In the illustrated embodiment, the flange member 58 includes a camming surface 74 (see FIG. 4) formed on its front edge for minimizing the drag of the flange member 58 on the turf at low cutting heights.

The remaining alternate embodiment of the member 44 is shown in FIGS. 1 through 3. In this embodiment, the member 44 includes a mid-body portion 78 which extends from the inner edge portion 46 and which is fixed relative to the housing 12. In this embodiment, instead of utilizing a vertically movable flange member 58 to increase the vertical extension of the lip 50 below the plane of cutting blade rotation, means in the form of a hinge 80 is provided for hingedly attaching the outer edge portion 48 of the member 44 to the mid-body portion 78. To serve the function of the slot 70 and pin 72 in the embodiment shown in FIGS. 4 and 5, upper and lower stops 82 and 83 are provided to limit the extent of vertical movement of the outer edge portion 48 in response to contact with the turf between an uppermost position (as shown in solid lines in FIGS. 2 and 3) generally coplanar with the mid-body portion 78 and a lowermost position (as shown in phantom lines in FIGS. 2 and 3) extending vertically downwardly from the mid-body portion 78.

In this embodiment, as the one shown in FIGS. 4 and 5, a camming surface 86 is formed on the forward edge of the lip 50 to thereby reduce the drag at low cutting heights.

While the size of the member 44 and its downwardly depending lip can vary, in the construction shown in FIGS. 1 through 3, the outer edge portion 48 can extend outwardly from the grass discharge outlet 42 for approximately 2 inches. The lip 50 can accordingly depend downwardly from the outer edge portion 48 for approximately 1 inch and make approximately a 110° angle (identified as A-1 in FIG. 2) with the outer edge portion 48. In this construction, the lower stop 83 limits the extent of downward travel of the outer edge portion 48 so that, when the outer edge portion 48 is in its lowermost position (shown in phantom lines in FIGS. 2 and 3), the outer edge portion 48 extends at approximately a 30° angle (identified as A-2 in FIG. 2) from the plane of the mid-body portion 78.

Various of the features of the invention are set forth in the following claims.

What is claimed is:

1. A lawn mower comprising a housing enclosing a rotary cutting blade and including a sidewall having therein an opening and a generally horizontal grass discharge passage extending from said opening, a member carried fixedly by said housing and extending in said grass discharge passage and including an inner edge portion located adjacently outside the periphery of the path of cutting blade rotation below the plane of cutting blade rotation, and an oppositely spaced outer edge portion located below the plane of cutting blade rotation, and a lip extending generally vertically downwardly from said outer edge portion.

2. A lawn mower according to claim 1 wherein said sidewall has an arcuate extent of less than 360° and terminates with arcuately spaced end portions, wherein said generally horizontal discharge passage extends from said arcuately spaced end portions of said sidewall, and further including a bar extending between said end portions of said sidewall and adjacently outside the periphery of the path of cutting blade rotation, said bar including a lower edge located below the plane of cutting blade rotation, and wherein said inner edge portion of said member is connected to said bar adjacent to said lower edge thereof.

3. A lawn mower according to claim 1 or 2 and further including a flange member and means operatively connecting said flange member on said lip for vertical movement relative to said lip.

4. A lawn mower according to claim 3 wherein said lip includes a forward edge, wherein said flange member includes a forward edge, and wherein said means operatively connecting said flange member on said lip includes pin means for pivotally mounting said forward edge of said flange member on said forward edge of said lip.

5. A lawn mower according to claim 4 wherein said lip includes a lower edge, wherein said flange member includes a lower edge, and further including means for limiting the range of pivotal movement of said flange member between a first position in which said lower edge of said flange member is generally aligned with said lower edge of said lip and a second position in which said lower edge of said flange member extends at an angle downwardly from said lower edge of said lip.

6. A lawn mower according to claim 3 wherein said flange member includes a front edge and a camming surface formed on said front edge.

7. A lawn mower according to claim 1 or 2 wherein said member includes a mid-body portion extending primarily horizontally from said inner edge portion and fixed relative to said housing within said grass discharge passage, and means for hingedly attaching said outer edge portion to said mid-body portion for vertical movement relatively thereto between a position generally coplanar with said mid-body portion and a position extending downwardly from said mid-body portion.

8. A lawn mower according to claim 7 and wherein said hinge means includes means for preventing downward vertical movement of said outer edge portion beyond a predetermined position vertically displaced below said mid-body portion.

9. A lawn mower according to claim 8 wherein said predetermined position is vertically displaced below said mid-body portion by no more than 30°.

10. A lawn mower according to claim 7 wherein said lip includes a forward edge and a caming surface formed on said forward edge.

11. A lawn mower according to claim 1 or 2 wherein said grass discharge passage includes an outlet spaced radially outwardly from the path of cutting blade rotation, and wherein said outer edge portion of said member terminates generally adjacently to said outlet of said grass discharge passage.

12. A lawn mower according to claim 1 or 2 wherein said grass discharge passage includes an outlet spaced radially outwardly from the path of cutting blade rotation, and wherein said outer edge portion of said member extends outwardly beyond said outlet of said grass discharge passage.

13. A lawn mower according to claim 12 wherein said outer edge portion extends approximately two inches beyond said outlet of said grass discharge passage, and wherein said lip extends approximately one inch below said outer edge portion.

* * * * *